Feb. 20, 1962 P. R BROADLEY 3,021,797
PULVERIZED COAL BURNING GENERATING ELECTRIC LOCOMOTIVE
Filed Dec. 31, 1956 7 Sheets-Sheet 1
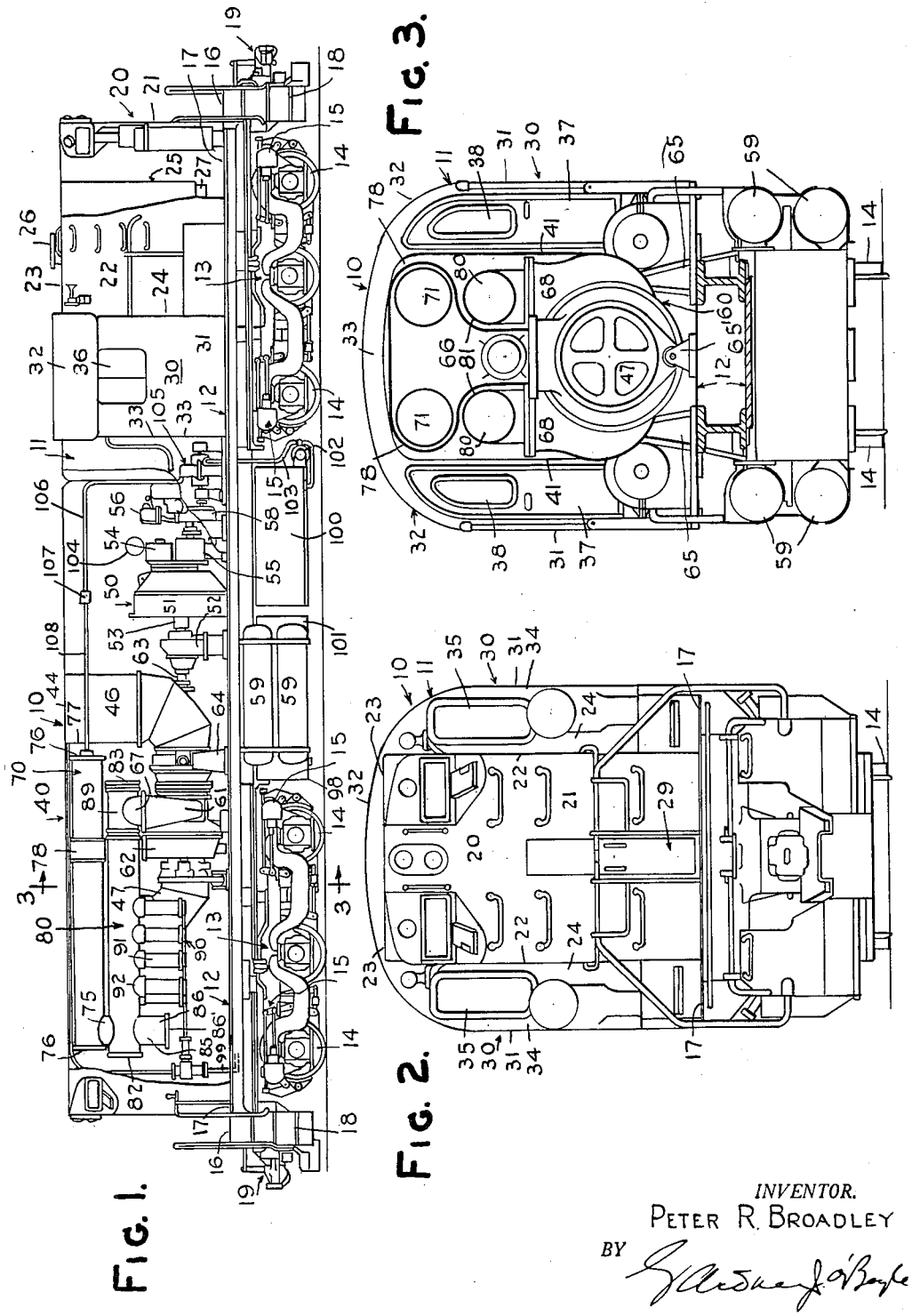
INVENTOR.
PETER R. BROADLEY
BY
ATTORNEY Feb. 20, 1962 P. R BROADLEY 3,021,797
PULVERIZED COAL BURNING GENERATING ELECTRIC LOCOMOTIVE
Filed Dec. 31, 1956 7 Sheets-Sheet 2

INVENTOR.
PETER R. BROADLEY
BY
ATTORNEY

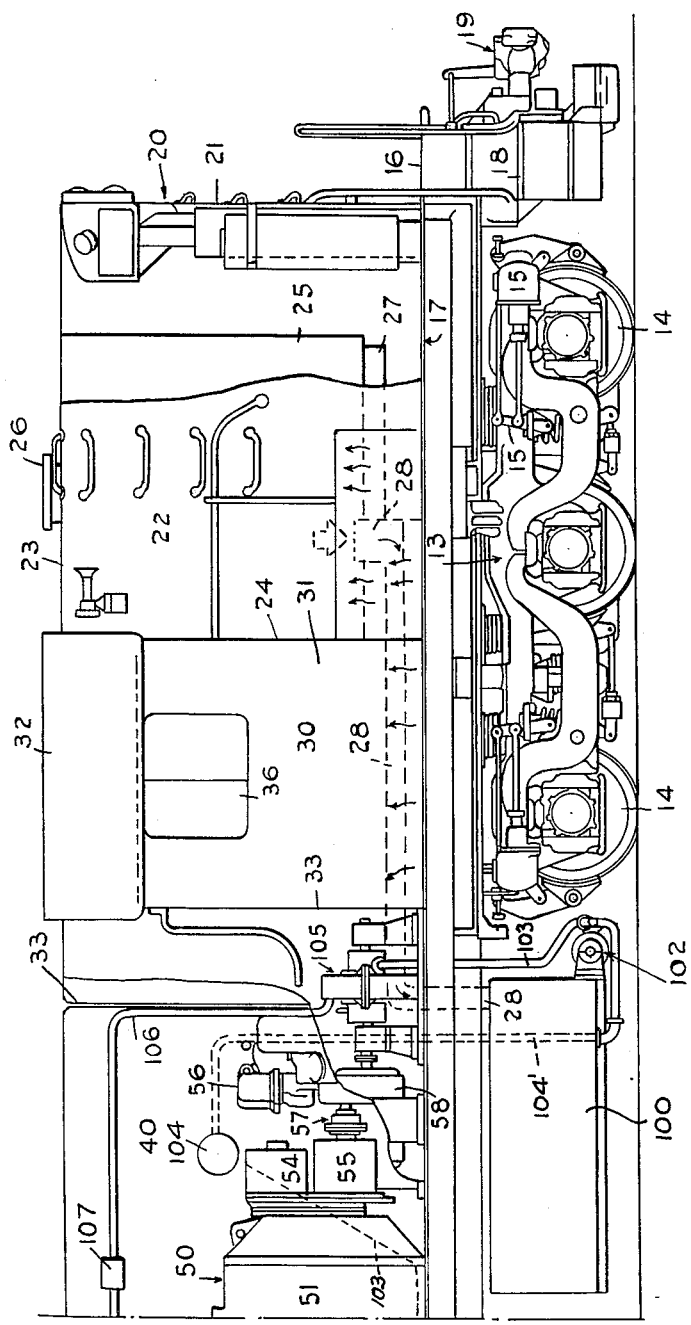

Feb. 20, 1962   P. R BROADLEY   3,021,797
PULVERIZED COAL BURNING GENERATING ELECTRIC LOCOMOTIVE
Filed Dec. 31, 1956   7 Sheets-Sheet 4
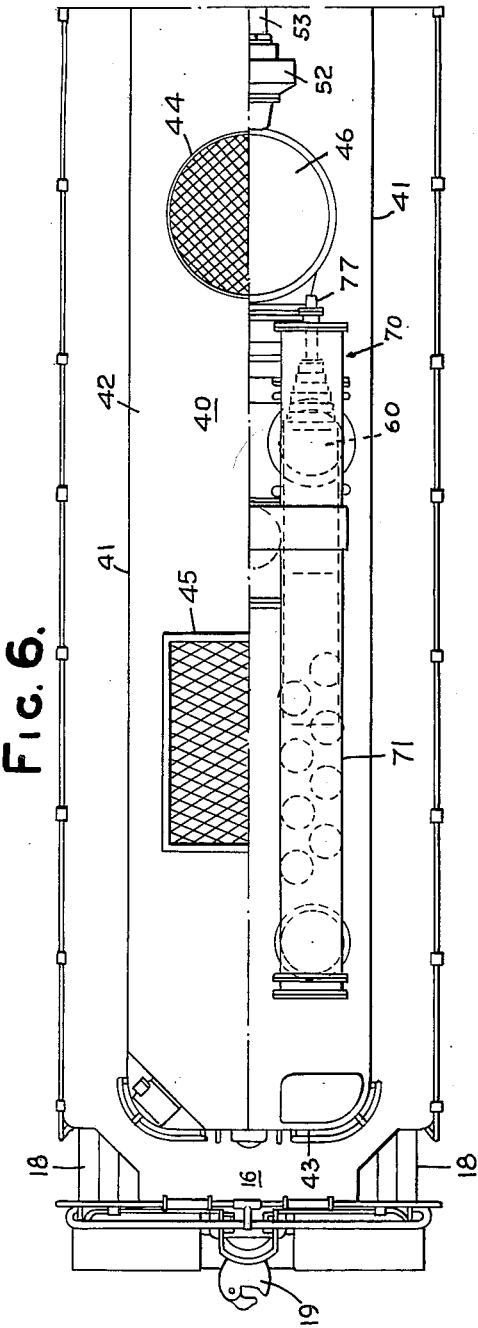
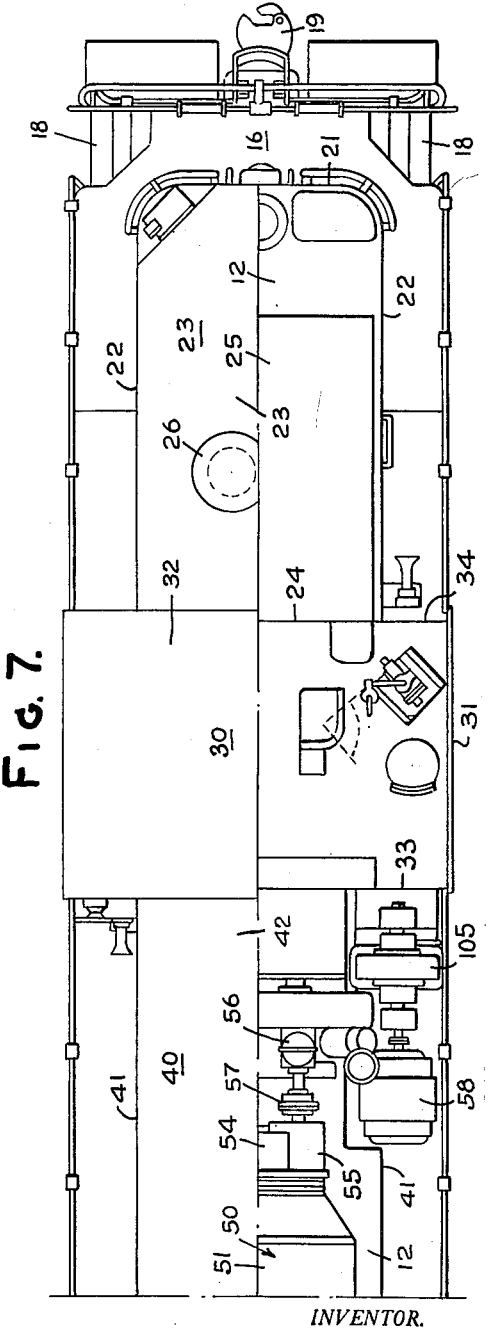
INVENTOR.
PETER R. BROADLEY
BY 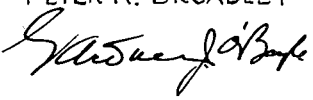
ATTORNEYS

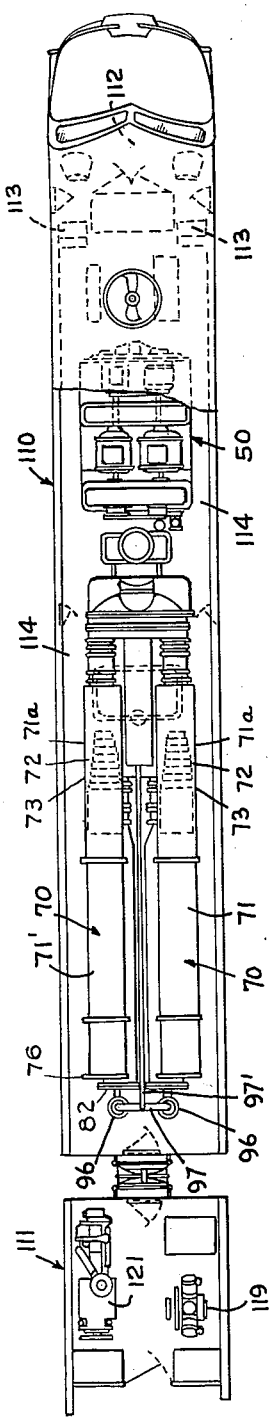

Feb. 20, 1962 P. R BROADLEY 3,021,797
PULVERIZED COAL BURNING GENERATING ELECTRIC LOCOMOTIVE
Filed Dec. 31, 1956 7 Sheets-Sheet 6
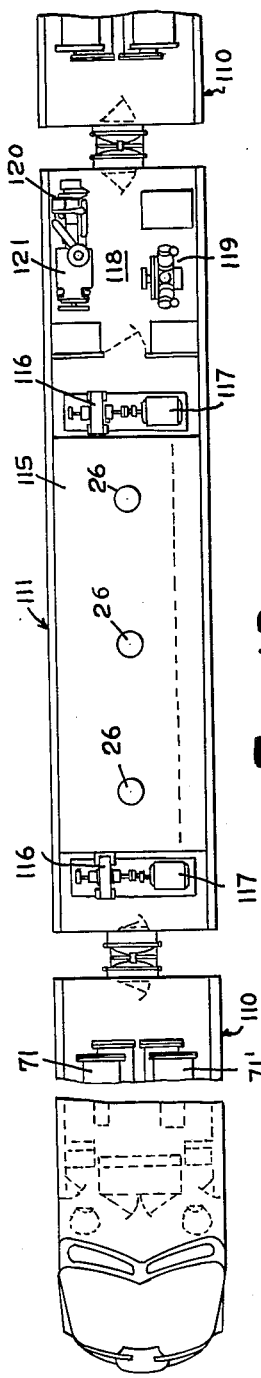
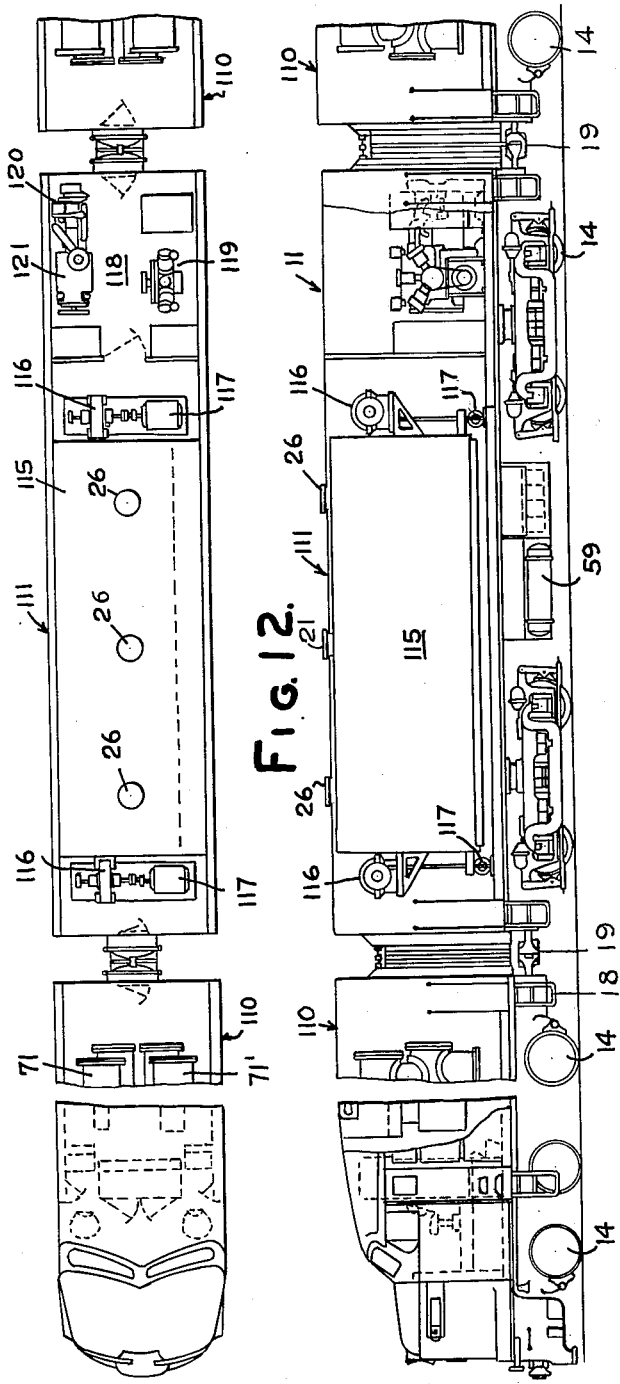
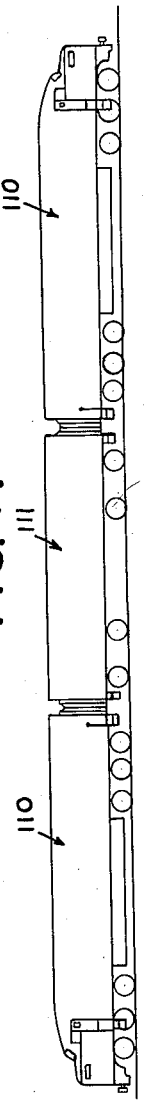
INVENTOR.
PETER R. BROADLEY
BY
ATTORNEYS Feb. 20, 1962 P. R BROADLEY 3,021,797
PULVERIZED COAL BURNING GENERATING ELECTRIC LOCOMOTIVE
Filed Dec. 31, 1956 7 Sheets-Sheet 7

INVENTOR
PETER R. BROADLEY
BY
ATTORNEY

3,021,797
PULVERIZED COAL BURNING GENERATING ELECTRIC LOCOMOTIVE
Peter Robert Broadley, Elizabeth, N.J., assignor to Bituminous Coal Research, Inc., Washington, D.C., a corporation of Delaware
Filed Dec. 31, 1956, Ser. No. 631,663
7 Claims. (Cl. 105—36)

This invention relates to coal-burning locomotives in which coal is burned, as a primary fuel, in a pressurized stream of combustive or primary air, the resultant pressurized gases of combustion, being cooled and diluted with pressurized secondary air, then purged of entrained incompletely burned combustible particles and other solid combustion residues, and the cleaned, hot pressurized gases are used as a motive fluid in suitable engines, operatively coupled to locomotive driving equipment.

More particularly, the invention, in a preferred embodiment, as illustrated in the accompanying drawings, is directed to a pulverized coal-burning, generating electric locomotive, comprised of at least one power car incorporating crushed coal storage or bunker means, and aerated coal storage tank subjoined to the locomotive, and pressurized pneumatic coal delivery means coupling the tank and a pressurized combustor installation through a primary air delivery line, the said primary air line embodying a coal-pump and a unit pulverizer.

The invention further comprehends the use of rotary solids transfer pumps, as detachable units, in the bottoms and lower sides of crushed solids storage tanks, so that the pumps are wholly submerged, or at least the solids entrance thereof are submerged, in beds of aerated free-flowing particulate solids. The pumps may be oriented in any manner consonant with the space available in the tanks, and no special means or manipulative procedures are required to insure filling of the pockets of the rotors as they are successively presented to the open solids entrance of the pump chambers.

In lieu of incorporating the coal storage means, and the coal delivery system in the locomotive, a power car with coupled tender, may be used. Where two or more power cars are used to form a multiple unit locomotive for heavy duty use, the invention comprehends the incorporation of a tender therebetween to serve as a common coal supply for the assembly. Desirably, the raw coal supply for the bunkers will be comprised of coal having a particle size of $<\frac{3}{8}''$ x 0, which is aeratable, yet free from danger of spontaneous combustion in pressurized air conveying and storage installations, too frequently characteristic of pulverized coal, under like operating conditions.

It is, therefore, among the features of novelty and advantage of the present invention to provide improved pulverized coal burning locomotives characterized by the following: pneumatic conveying of non-flammable, particulate coal ($<\frac{3}{8}''$ x 0, particle size) in pressurized, primary air streams; demand delivery of primary air borne, non-flammable aerated coal to a pressurized combustion apparatus through a unit pulverizer wherein the coal is pulverized, as fed to the combustors, and the residence time of the pulverized coal in the pressurized primary air feed line is momentary and insufficient to permit spontaneous combustion of the pulverized fuel particles; atmospheric storage of non-flammable particulate coal in the locomotive, with free-flowing gravity transfer of the coal, through an aerating conduit, to a subjoined, aerated coal storage tank discharging into the primary air line through a variable speed, rotary coal pump.

Other features of novelty and advantage of the invention herein include generating electric locomotives incorporating: gas turbine-driven generators; turbo-compressor mounted in the central longitudinal axis of the locomotive, with centrally disposed air intake and exhaust stack severally embouched in the roof; duplex combustors bilaterally disposed with respect to the turbo-compressor and its air intake and exhaust stacks; ash separators coupling the discharge ends of the combustors and turbine inlets; batteries of reverse flow, vortical whirl separators integral with and externally joined to the ash separators, each vortical whirl separator embodying improved pneumatic blowdown means effective to continuously remove separated solids concentrated in a blowdown stream of the pressurized gaseous fluid being cleaned; ash concentrator means receiving the collective separated ash-bearing blowdown streams and effective to separate collected solids from gaseous entrainment; and means for optionally discharging the collected solids into a subjoined water tank for quenching and storage when the locomotive is operating in urban or other restricted areas, or to discharge the separated solids through a suitable pneumatic quenching device directly into the atmosphere, when operating in the open country.

The combination of the improved features, hereinbefore recited, in a novel locomotive, makes for a unitary invention, and makes possible the substitution of a coal-burning primary power plant for diesel power in conventional diesel-electric locomotives.

The above recited features of novelty and advantage of the present invention while primarily intended for incorporation in mobile, self-powered equipment, are equally well adapted for incorporation into and improvement of the operation of permanent power plants.

The novel improvements of the invention are illustrated, by way of example only, both alone and in combination, in the accompanying drawings, in which FIGURE 1 is a side view of a locomotive, with part of the housing removed to show the power plant;

FIG. 2 is a front elevation of the locomotive of FIG. 1;

FIG. 3 is a view taken on line 3—3 of FIG. 1, showing the turbo-compressor mounting, in association with the combustors and ash separators;

FIG. 5 is an enlarged side elevational view of the right end of the locomotive shown in FIG. 1;

FIG. 6 is a top plan view of FIG. 4, with part of the top of the locomotive removed;

FIG. 7 is a top plan view of FIG. 5, with part of the top of the locomotive removed;

FIG. 8 is a top plan view of a power car and coupled tender;

FIG. 9 is a side elevational view of the arrangement shown in FIG. 8;

FIG. 10 is a plan view of the tender;

FIG. 11 is a schematic showing of a multiple unit locomotive, comprising two power cars with a tender therebetween;

FIG. 12 is a side elevational view of the tender shown in FIG. 11, with power units broken away;

FIG. 13 is a plan view of the arrangement shown in FIG. 12;

Figure 4:
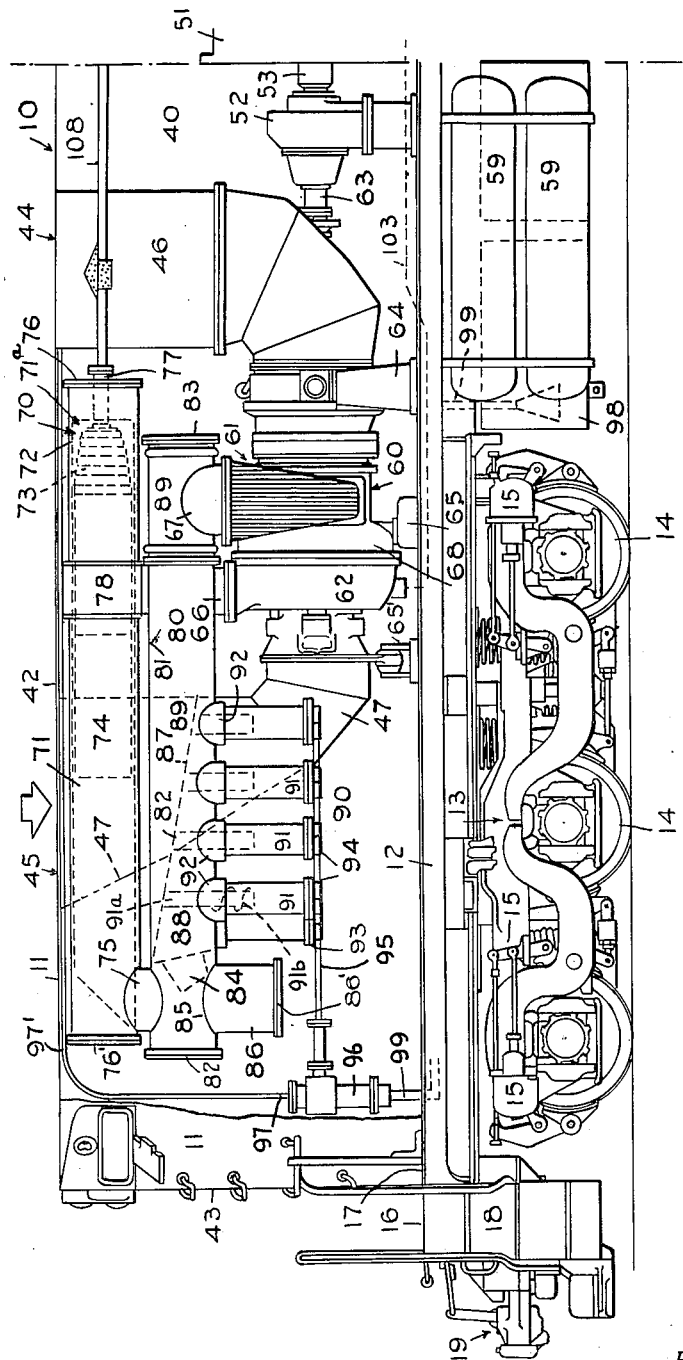
FIG. 4 is an enlarged side elevational view of the left end of the locomotive shown in FIG. 1.

Turning now to the drawings, there is shown a generating electric locomotive 10, having a superstructure or housing 11, a supporting deck or floor, designated generally by the numeral 12, trucks 13, pivotally subjoined to the floor, and mounting motor-driven wheels 14 and the usual brake gear 15. The floor is provided with front and rear platforms 16, and side platforms or gangways 17 extending rearwardly of the control stations of cab 30. Steps 18, coupling gear 19, and the usual grab irons and hand rails are provided, as shown in FIG. 1.

The superstructure 11 of the locomotive is divided into three parts: a nose section 20, a control cab section 30, and a rear power plant section 40, which will be separately described.

The nose section 20 is mounted on the forward end of the engine floor 12 and forms an elongated cubical chamber having a front wall or face 21, side walls 22, and roof 23. The rear wall 24 forms the forward wall of the control cab and is bilaterally extended the full width of floor 12, and is also extended upwardly. The section 20 mounts an inner tank 25, having a coal filling hatch 26, and a bottom discharge trough 27, connected to a secondary aerated coal storage tank through duct 28. The front face 21 of the nose section mounts the usual train marker lights and grab irons, and embodies a door 29 giving access to a small storage compartment for signal equipment and the like.

The control cab 30 extends across the full width of the locomotive, and is comprised of side walls 31, front wall 24, curved roof 32 and rear wall 33, coextensive with the front wall 24, and forming the front wall of the engine room or power plant section 40. The lateral extensions of the transverse wall 24 are designated by the numeral 34, and severally mount front view windows 35, in front of the engineer's and fireman's station. The side walls 31 mount side windows 36, and the bilateral extensions of rear wall 33, mount cab doors 37, fitted with rear view windows 38. The front and rear view windows give a clear, unobstructed view along the sides of the locomotive.

The power compartment 40 of the locomotive is housed in a chamber comprised of a floor 12, front wall 33, side walls 41, roof 42, and rear face 43, which essentially duplicates the front face 21. The roof 42 is provided with front and rear vents or openings 44, 45, respectively, serving as the outlets for exhaust stack 46, and air inlet stack or duct 47.

The power plant proper is comprised of the following units housed in compartment 40: generator system 50, turbo-compressor unit 60, combustor system 70, ash separator 80, and unit pulverizer 105. Ash disposal and coal storage and feeding units are subjoined to the floor of the locomotive, as will be described more in detail hereinafter.

The main generator system 50 is comprised of a main generator 51, driven from gear reduction unit 52 by shaft 53. An exciter 54 is operatively coupled to the main generator as is an auxiliary generator 55. An air brake compressor 56 is powered by generator 55 through coupling 57. Generator 55 also supplies power to motor 58 which is used to drive rotary unit pulverizer 105, desirably at constant speed. The controls for the generator system are mounted in cab 30 on its rear wall 33, as are the controls for the coal feeding system. Air reservoirs 59 are underslung from the locomotive frame, and are coupled to air brake compressor and the air brake line in the usual manner.

The turbo-compressor unit 60 is comprised of a gas turbine 61 and main air compressor 62, whose rotors are mounted on a common shaft 63, which is operatively coupled to the gear reduction unit 52. The shaft 63 will be disposed in the vertical plane of the central longitudinal axis of the locomotive. The unit 60 is supported on the floor of the locomotive by pedestals 64, 65 and 65'. The compressor, as shown, is of the axial centrifugal type with an axial inlet into which the discharge end of air inlet duct 47 is embouched, and is provided with a bifurcated peripheral secondary air discharge 66, which is coupled to the casings of the combustors of the combustor system 70. Diametrically opposed inlets 67 serve to direct cleaned, hot, pressurized motive fluid from the parallel, cleaned gas plenum chambers of the ash separator 80, into the inlet casing 68 of the turbine, which discharges its spent, exhaust gases through exhaust stack 46.

The combustor system 70 is essentially comprised of an identical pair of parallel cold wall combustors 71, 71', mounted along the upper part of compartment 40 in the angles defined by the roof 42 and side walls 41. The combustors illustrated are of the type generally shown and claimed in the pending application of Frederick D. Buckley, Ser. No. 257,165, filed November 19, 1951, for Cold Wall Combustor With Flexibly Mounted Flame Tube, now Patent 2,823,627, issued February 18, 1958, and will not be described in detail herein, except to note their preferential embodiment in the novel locomotive of this invention. The combustors are severally comprised of elongated casings 71a, mounting demountable radiation shields 72 and interfitted, flexibly mounted flame tubes 73, which occupy the upstream ends of the casings 71a. The downstream ends of the casings 71a serve as mixing and cooling chambers for the admixture of combustion residue-bearing combustion gases with tertiary air delivered between the casings and the radiation shields into the mixing chambers 74. The tempered and cooled (1300° F.) motive fluid is delivered into the inlet ends of the ash separators 80 through downcomers 75. The upstream and downstream ends of the casing 71a are flanged and closed by detachable end plates 76, 76'. Burners 77 may be fitted in end plates 76, as shown.

A special feature of the present invention is the novel equipment for delivering non-combustive (secondary and tertiary) air to the combustor casings through bustles 78 disposed about the casings about midway of the flame tubes. The bustles 78 are integral with and form discharge annuli for the bifurcations of compressed air delivery duct 66. The air from the bustles 78 is introduced between the casings and the mid-sections of radiation shields 72, one portion flowing toward the burner ends to serve as secondary air, and the remainder flowing toward the mixing chambers 74 to serve as tertiary, coolant air for admixture with the superheated gaseous products of combustion, to effect chilling and quenching of molten and incompletely burned fuel particles entrained therein. Desirably, the combustor casings may be provided with radiation shields extending to the downstream end of the casings, and severally terminating in curvilinear, louvered deflectors adapted to form a down-streaming coolant gas film on the inner surface of the shield, into which the solid residues of combustion are rectilinearly projected and quenched out of contact with the main, hot gas stream.

The hot, residue-bearing, gaseous products of combustion are discharged through the downcomers 75, into the ash separator system 80. The separator system, generally, and the louvered combustors, in combination with a gas turbine power plant, were specifically disclosed and claimed in co-pending application, of John I. Yellott and Peter R. Broadley, Ser. No. 330,077, filed January 7, 1953, now Patent 2,911,065, issued Nov. 3, 1959, for "Coal-Burning Gas Turbine Power Plants Incorporating Novel Self-Supporting and Pressure-Sustaining Vortical Whirl Separators Together with Improved Ash Quenching and Blowdown Means," and in a division thereof, Ser. No. 499,123, filed April 4, 1955, now Patent 2,888,804, issued June 2, 1959.

Considering the separator system more in detail, it will be seen to be comprised of identical, parallel disposed horizontal units coextensive with the combustor and subjoined thereto. Each separator unit is comprised of a cylindrical housing or casing 81, capped at both ends by detachable plates 82, 83. The upstream end of each casing 81 is apertured to receive the downcomer 75, and a diametrically opposed aperture 85 serves as an embouchure for a subjoined drop-out pot 86 having a detachable bottom closure 86'. The drop-out pot serves to receive consolidate aggregates of combustion residues projected downwardly through downcomer 75. A screen 84 is fitted across the separator inlet. Each casing 81 is provided further with an internal slopesheet 87 extending from the top of the casing to the bottom, as shown, and dividing the casing into an upstream, dirty gas (residue-bearing) plenum chamber 88, and a downstream, cleaned gas plenum chamber 89 which discharges directly into turbine inlet 67.

The novel reverse flow, vortical whirl separators, of our said Patent 2,911,065, are designated generally by the numeral 90, and their main features, together with the preferred mode of integration with casings 81, will now be considered. Each separator comprises a cylindrical body or barrel 91, hermetically and detachably subjoined to a nipple 92, formed as an integral part of dirty gas plenum chamber 88. A blowdown chamber 93 is provided adjacent the capped, flat bottom 94 of the separator. Each chamber 93 is in free fluid communication with the interior of the separator, and discharges through a blowdown line into a manifold 95. The manifold delivers air-borne separated solids to an ash concentrator 96, from whence the further concentrated solids are discharged into an ash slurry storage tank 98, through pipe 99, the cleaned gas outlet of the ash concentrator 96 discharges into the turbine exhaust stack through lines 97 and 97', all as disclosed and claimed in our co-pending application, Ser. No. 330,076, filed January 7, 1953, now Patent 2,857,854, issued Oct. 28, 1958, for "Generating Electric Locomotive With Coal-Burning Gas Turbine and Improved Coal Supply and Ash Removal Systems." The reverse flow feature of each separator 91 is effected in the following manner: An axial cleaned gas discharge pipe 91a is hermetically embouched in slopesheet 87 and depends into the barrel of casing 91, providing an uninterrupted duct between the separator and the cleaned gas plenum chamber. Spin-imparting means 91b, comprising an annular array of deflector vanes, are mounted peripherally of the pipe 91a, and may be detachably secured in place, in and between the separator barrel and nipple 92.

*Coal storage and delivery system*

The feature of the present invention which makes possible the substitution of a coal-burning gas turbine power plant for the diesel power of a diesel-electric locomotive, is the improved coal storage and delivery system, now to be described:

In conventional coal-burning locomotives, coal may be mechanically fed to stack-draft fire boxes from tenders coupled in the locomotive. According to the teachings of the present invention, coal is carried on the locomotive, and in pneumatically handled and deliverd, in a pressurized combustive air stream, to the burners of pressurized combustors.

An important and critical feature of the novel fuel supply herein is the maintenance of the coal, in particle form, in a pressurized air stream, without danger of spontaneous combustion. This is effected by using coal having a particle size of $<3/8''$ x 0, and pulverizing the coal in the combustive air feed line, immediately before delivery to a burner. The use of crushed coal, in the particle size indicated, permits the use of aeration techniques for the pneumatic delivery of coal to storage tanks, and transfer between tanks, at ambient atmospheric pressure, and the introduction of such coal, through a rotary coal transfer pump, into a pressurized combustive air feed line embodying a unit pulverizer.

Turning now to FIG. 1, the coal supply system will be seen to embody a main, vented storage tank 25 in the locomotive. The coal is fed into the tank, in aerated condition, and may be de-aerated therein to increase the weight of coal carried. A secondary aerated coal storage tank 100, of substantially one-half the load capacity of tank 25, is underslung on the locomotive, as shown. This combination, in a locomotive mounting a 3000 shaft horsepower gas turbine, would provide a crushed coal storage capacity totaling 12.5 tons, which is more than sufficient for the standard run of a locomotive, either in through-freight or passenger service, or in shifter duty in classification yards.

At this point, it is well to bear in mind that contrary to conditions obtaining with coal-burning steam locomotives, there is no need for refueling or reservicing a gas turbine locomotive at intermediate points, as the gas turbine uses no water, and space normally required for water storage is made available for the storage of crushed coal. Additionally, it is to be noted that the space normally required for cooling equipment in a diesel installation can also be utilized for coal storage, if desired. The freedom from water as a main operating element, makes a gas turbine powered locomotive particularly suitable for use in arid regions, as well as regions subject to conditions of intermittent drought.

Returning to the coal supply system, the tanks 25 and 100, as well as chutes or ducts 28, are provided with aerators as bottom linings, the aerators being connected to a suitable air supply (ca. 2–10 p.s.i.), not shown. In operation, the aerating air supply is turned on, and the combustor, which has been burning oil from fuel oil tank 101, to start the turbine, is switched over to coal feed. Coal pump 102, mounted at one end of tank 100, is operated at the desired coal feed speed, and coal is introduced into pressurized combustive air feed line 103 which is provided with pressure air from booster pump 104 connected in line 103 from main air compressor 62, the booster pump discharging into line 104', as shown. The resulting streaming entrainment of coal particles is delivered in rotary unit pulverizer 105, wherein it is pulverized. The streaming entrainment of pulverized coal from unit pulverizer 105 is then delivered directly to the burners 77 through main feed line 106, coal splitter 107, and branch feed lines 108.

Referring to FIGS. 8 and 9, there is shown a modified locomotive arrangement comprising a power car and coupled tender. The power car, designated generally by numeral 110, is provided with the power components of the power plant section 40, of the locomotive described hereinabove, however, in lieu of incorporating the coal storage means, and the coal delivery system in the locomotive, a tender 111, adapted to be operatively coupled to the power car, is provided. As will be seen in FIGS. 8 and 9, the power components of car 110 include combustors 71, ash separator system 80, turbine 61, main compressor 62, and the electric generator system 50, and associated air duct 50'. The forward portion of the car is formed with a control cab having a floor 112, above the level of main supporting deck or floor 12, access to the power components from the cab being had by means of openings in the rear wall of the cab adjacent suitable steps 113, and thence along aisles 114 at opposite sides of the car.

The tender 111, is provided with an aerated coal storage tank 115, having a coal pulverizing unit 116, and a coal pump 117 mounted on opposite ends of the tank, constructed and arranged to deliver coal from the tank to a pressurized combustive air feed line, not shown, as a streaming entrainment of coal particles, to the combustors 71, 71' of the power car. The forward portion of tender 111, as shown in FIG. 10, is formed with a compressor compartment, designated generally by numeral 118, having a main compressor 119 to supply air to the aerating means in the bottom of tank 115, and to also provide air to the combustive air feed line, which carries the coal to the combustors. Compressor 119 may be operated by means of a diesel engine 120 and its associated generator 121.

As illustrated in FIGS. 11–13, a two unit locomotive may have a coal tender coupled therebetween. In this modification two power cars 110 and a tender 111 of the type described in connection with the arrangement shown in FIGS. 8 and 9, may be used.

The details of the preferred types of aerators for use herein are disclosed and claimed in applications of John I. Yellott: Ser. No. 411,930, filed February 23, 1954, for "Improved Pneumatic Material Handling System and Apparatus," now Patent 2,805,896, issued September 10, 1957; Ser. No. 423,978, filed February 23, 1954 now pending, for "Powdered Coal-Burning Gas Turbine Power Plant with Pneumatic Coal Conveying System Therefor"; and Ser. No. 458,479, filed September 27, 1954, now Patent 2,805,897, issued Sept. 10, 1957, for "Pneumatic Fluidized Material Handling System and Method."

Rotary unit pulverizers, suitable for use, either in whole or in part, in the locomotive of the present invention, are disclosed and claimed in the co-pending applications of John I. Yellott, Ser. No. 423,978, now pending, Ser. No. 481,346, filed January 12, 1955, now Patent 2,839,253, issued June 17, 1958, for "In-Line Pneumatic Mechanical Unit Pulverizer (I)," and Ser. No. 481,347, filed January 12, 1955, now Patent 2,916,217, issued Dec. 8, 1959, for "In-Line Pneumatic Mechanical Unit Pulverizer (II)."

By reason of the limited space available in a locomotive, for non-motive equipment, the interposition of even a relatively small rotary solids pump in the area between a coal storage tank and a combustion-ash separator installation, causes cramping of the quarters, and resultant lack of working room. I have found that considerable improvement in the operation of aerated solids transfer systems, together with significant reduction in space requirements therefor, can be effected by embodying the rotary solids transfer pumps, as detachable units, in the bottoms and lower sides of crushed solids storage tanks, so that the pumps are wholly submerged in the aerated solids in the tanks, and the solids have unrestrained and direct access to the pump chambers. Such a system permits of the elimination of feed hoppers and special feeders between the storage tanks and pumps, heretofore required. The use of the novel system herein also permits of the orientation of the pumps in any manner consonant with space available in the tanks, because of the fact that with at least the solids entrance of the pumps submerged at all times in beds of aerated, free-flowing, particulate solids, no special means or equipment, or manipulative procedures are necessary or required to insure filling of the pockets of the rotors as they are successively presented to the open solids entrance of the pump chambers.

Figure 14:
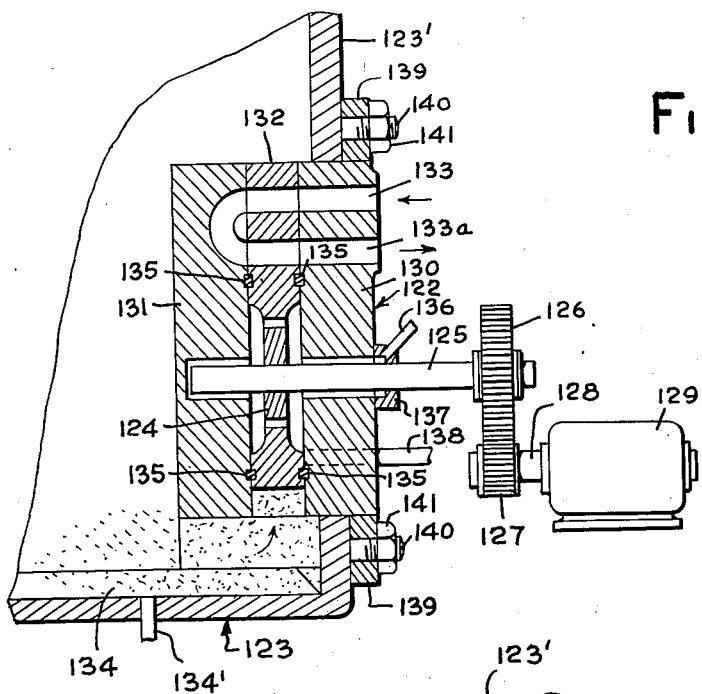
FIG. 14 is an enlarged sectional view of a lower corner of an aerated coal storage tank having a coal pump mounted therein.

Referring to FIG. 14, there is shown a coal pump 122, mounted in a lower corner of an aerated coal storage tank 123. The pump comprises a peripherally pocketed rotor 124, secured to a shaft 125 rotatably mounted in the pump housing. The outboard end of the shaft is provided with a gear 126 adapted to mesh with gear 127 secured to the shaft 128 of a suitable electric motor 129 used to drive the pump. The pump housing comprises spaced members 130 and 131, and an intermediate member 132, forming a closure for the top and sides of the housing, the bottom of the housing being open, as shown, to permit free access of aerated coal from the tank 123 to the peripheral pocketed rotor 124. The housing is formed with an inlet passage 133 to receive air from a pressurized combustive air feed line, not shown, and an outlet passage 133a for the streaming entrainment of coal particles removed from the pockets of the pump rotor.

The coal storage tank 123 is provided with aerators 134 as bottom linings, the aerators being connected to a suitable air supply through a conduit or pipe 134'. The aerators are in the form of air-pervious mattresses, tubes or other hollow members formed of woven materials, as disclosed in Yellott Patents 2,805,896 and 2,805,897 referred to hereinabove. To prevent seepage of coal particles around the packings 135 of the rotor and into bearings for shaft 125, a high pressure air line 136 may be tapped into the fitting 137 which covers the shaft bearing. In order to reduce the pressure of the coal pump pockets below the pressure of the solids entrance, a negative pressure may be introduced through line 138 connected to a suitable aspirator, not shown. The coal pump unit, may be conveniently mounted in the lower corner of the coal tank, with the rotor submerged in the aerated coal, by means of apertured lugs or ears 139, adapted to fit over threaded studs 140, and clamped against the wall 123' by nuts 141.

In the operation of the above described pump, assuming that the rotor is rotating, the aerated coal in the tank, and more particularly, the coal in the vicinity of the entrance to the pump, flows in the direction of the arrow and is picked up by the peripheral pockets formed in the rotor. As the pockets come into register with the combustive air feed passage 133 the coal is blown outwardly thereof into passage 133a and thence to a combustor feed line.

Figure 15:
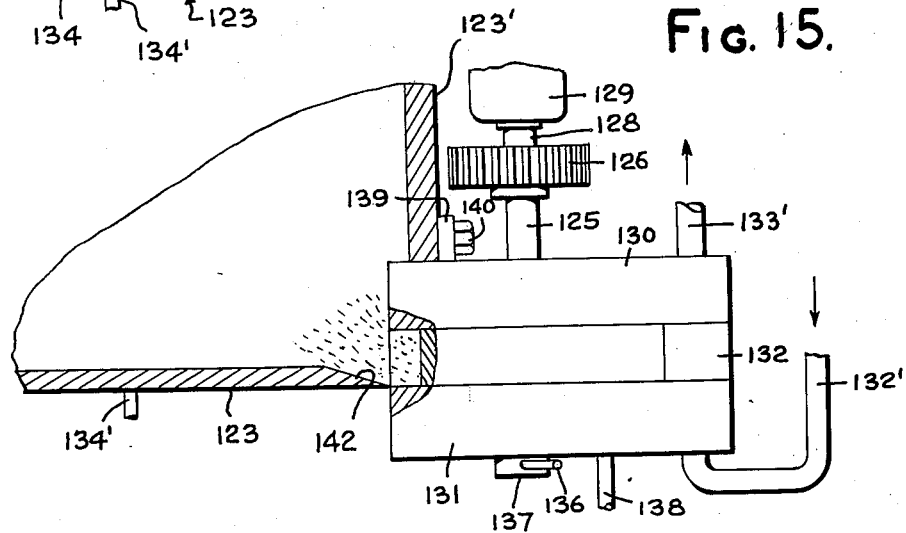
FIG. 15 is a view similar to FIG. 14 showing a coal pump mounted on the side of the tank with the pocketed portion of the pump rotor within the tank.

Referring to FIG. 15, the pump unit of FIG. 14 is mounted exteriorly of the aerated coal tank, with the entrance to the pump inside of the tank at a bottom corner thereof. The bottom of the tank is formed with a downwardly tapered portion 142 in the vicinity of the pump entrance, to permit free and unobstructed flow of the aerated coal into the entrance and thus provide a continuous supply of coal to the pockets of the rotor. A pressurized combustive air feed line 132' from a suitable source of air supply, not shown, is tapped into, or otherwise connected to the inlet passage 133 (FIG. 14) and an outlet line 133' is similarly connected to the outlet passage 133a.

As explained in connection with the arrangement shown in FIG. 14, it is contemplated that means be provided to reduce the pressure of the coal pump pockets below the pressure of the solids entrance. If the pressure of the pockets, after they move out of register with the combustive air feed passage 133, is permitted to remain greater than the pressure at the entrance, the sudden expansion of the air as a pocket passed by the opening or entrance to the pump would limit the amount of solids entering the pump, and in some cases, depending upon the pressure differential, might prevent any appreciable flow of solids into the pump.

In order to reduce the air pressure of the empty pockets, a "putt-putt" ejector may be used. The coal pump conveying air ranges in density from 3 to 7 atmospheres for the system of the present application, and it is therefore an ideal source of air for the ejector. By proper design of the size of the ejector nozzle, a comparatively small line can be tapped into the main upstream conveying air source, with the result that the ejector becomes substantially self regulating, for the reason that as the density of the conveying air increases, the ejector will have a greater aspirating capacity to handle the increased flow from the "putt-putt" vent. The ejector, of course, should be designed to handle the maximum flow being supplied under the operating conditions of the pump, and the exhaust from the ejector should be vented to the tank supplying the coal which is under atmospheric pressure.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

What is claimed:

1. In a coal burning locomotive of the character described, including, a completely enclosed cab mounted on a chassis and coextensive therewith; wheeled trucks pivotally secured to and supporting the chassis; power translating means coupled to at least one set of wheels; power generating means in the cab coupled to the power translating means; at least one engine driver's station and controls in the cab, the controls being operatively connected to the said power generating and translating means; a gas turbine incorporated in the power generating means and serving as a prime mover; a pressurized combustor coupled to the turbine and supplying pressurized motive fluid therefore and thereto; separate primary and secondary air supply means coupled to the combustor, the improved coal storage, feeding and conveying system for delivering coal to the combustor, comprising crushed coal supply means including at least one crushed solids fuel tank incorporating pneumatic fluid transfer means; conduit means for the primary air supply to the combustor incorporating, seriatim, a rotary crushed solids transfer pump in free communication with the solids fuel tank, and a unit pulverizer; ash separating means incorporated in the motive fluid supply line and including atmospheric ash-quenching and storage means, and means for venting cleaned turbine exhaust gas to the atmosphere.

2. In a coal burning locomotive according to claim 1, characterized by the fact that by-pass means are provided between the ash-quenching and storage means and the turbine exhaust stack, whereby, at the option of the engineer, separated ash can be discharged directly to the atmosphere in the turbine exhaust.

3. In a coal burning locomotive of the character described, including, a pressurized combustion system serving as a motive fluid generator and discharging into an expansion engine; power converting means coupling the engine and the driving wheels and incorporating control means; a cab mounting control posts and the control means; the improved coal storage, feeding and conveying system for delivering coal to the combustion system, comprising a first crushed coal storage means and a second crushed coal storage means; chute means connecting the two said coal storage means; aerating means incorporated in the bottom of each said coal storage means and the chute means; air supply means coupled to the aerating means; a rotary coal transfer pump in free communication with the first crushed coal storage means and discharging into a pressurized primary combustive air feed line to the combustion system; a primary combustive air supply coupled to the primary air feed line; and a unit pulverizer in the primary air feed line between the rotary coal transfer pump and the pressurized combustion system.

4. In a coal burning, generating electric locomotive, of the character described, including, a motor-driven locomotive; generators on the locomotive and electrically coupled to the driving motors; a turbo-compressor unit coupled to and driving the generators; a motive fluid generator for the turbine comprising at least one pressurized combustor incorporating dual burner means adapted to selectively burn gasiform fluid combustibles and primary air-borne pulverized solid combustibles; duct means coupling the compressor unit of the turbo-compressor with the combustor and adapted to selectively deliver secondary air to the upstream end and tertiary air to the downstream end of the combustor; ash separator means coupling the combustor and the turbine and effective to deliver cleaned pressurized motive fluid to the turbine, and separated ash to ash disposal means; the improved fuel storage, feeding and conveying system for delivering fuel to the burners, comprising fluid fuel storage means and particulate solid fuel storage means, the particulate solid fuel feed line comprising a pressurized, primary air line incorporating a variable drive, rotary coal transfer pump in free communication with the coal storage means at its lowermost point, and a unit pulverizer immediately in advance of the burner.

5. In a powdered coal burning, gas turbine-powered locomotive including, a locomotive having the usual trucks supporting the ends thereof, the trucks being mounted on wheels and pivotally supporting the locomotive frame and superposed housing; a gas-turbine power plant, including a powdered coal burning pressurized gaseous motive fluid generating means incorporating ash separating and disposal means, mounted in the housing; power translating means coupling the turbine and the wheels; power control means for the locomotive; the improved coal storage, feeding and conveying system for delivering coal to the gaseous motive fluid generating means, comprising aerated powdered coal storage means, discharging, in gravity flow, into rotary coal transfer pumps; and pressurized combustive air supply means coupled to the discharge side of the pumps and effective to deliver combustive aerated coal to the gaseous motive fluid generating means.

6. In a coal burning, gas-turbine powered locomotive, including, a diesel-electric type generating electric locomotive incorporating electrical driving and control equipment together with a gas turbine-powered electric generator; pressurized combustion equipment for generating motive fluid for the turbine comprising at least one combustor discharging motive fluid into the turbine through a battery of reverse flow vortical whirl separators incorporating continuous pneumatic blowdown and removal of separated solids; the improved coal feeding and conveying means for delivering pulverized coal to the combustor comprising a primary air supply and a primary air feed line to the combustor incorporating a pneumatic-mechanical rotary unit pulverizer in advance of the combustor and a rotary coal transfer pump in advance of the pulverizer; and aerated coal supply means embodying the coal transfer pump.

7. Coal burning locomotive according to claim 6, characterized by the fact that the aerated coal supply means includes a cubiform tank embodying dilatable, air-pervious mattresses in the bottom thereof, whereby on passage of aerating air from the mattresses into and through a superposed body of crushed coal of <.125 particle size, the coal is aerated and rendered free-flowing and its angle of repose is reduced from about 45° to about 10°.

References Cited in the file of this patent

UNITED STATES PATENTS

| | | |
|---|---|---|
| 243,916 | Joss | July 5, 1881 |
| 609,744 | Hennig | Aug. 23, 1898 |
| 1,723,957 | Stevenson | Aug. 6, 1929 |
| 1,882,861 | Moore | Oct. 18, 1932 |
| 2,008,446 | Grindle | July 16, 1935 |
| 2,181,006 | Beale | Nov. 21, 1939 |
| 2,265,750 | Tate | Dec. 9, 1941 |
| 2,510,753 | Multhaup | June 6, 1950 |
| 2,533,866 | Yellott | Dec. 12, 1950 |
| 2,712,963 | Edwards | July 12, 1955 |